United States Patent

Fagarazzi

[15] 3,648,534
[45] Mar. 14, 1972

[54] ANTILASH MECHANISM FOR THE CHANGE SPEED GEARING OF MOTOR VEHICLES AND OTHER PURPOSES

[72] Inventor: Frank Fagarazzi, Airport West, Victoria, Australia

[73] Assignee: General Motors Corporation, Detroit, Mich.

[22] Filed: June 10, 1970

[21] Appl. No.: 45,177

[30] Foreign Application Priority Data

July 3, 1969 Australia .............................. 57437/69

[52] U.S. Cl. .............................................................. 74/440
[51] Int. Cl. ......................................................... F16h 55/18
[58] Field of Search ............................................. 74/440, 409

[56] References Cited

UNITED STATES PATENTS

| 1,558,222 | 10/1925 | Beetow | 74/440 |
| 1,608,050 | 11/1926 | Bailey | 74/440 |
| 1,619,799 | 3/1927 | Rounds et al. | 74/440 |
| 1,968,338 | 7/1934 | Earles et al. | 74/440 |
| 2,310,232 | 2/1943 | Hale | 74/440 |
| 3,496,794 | 2/1970 | Forichon | 74/440 |

*Primary Examiner*—Leonard H. Gerin
*Attorney*—W. E. Finken and A. M. Heiter

[57] ABSTRACT

The invention concerns antilash gear mechanism for the change speed gearing of motor vehicles and other purposes and comprises a helical driven gear adapted to remain in constant mesh with a helical driving gear, a helical antilash gear axially coaligned with said driven gear and loosely mounted on one side thereof so that relative angular movement may occur between said antilash and driven gears and spring means associated with the last-mentioned gears for opposing undesirable axial separation therebetween when in use.

6 Claims, 6 Drawing Figures

Patented March 14, 1972  3,648,534
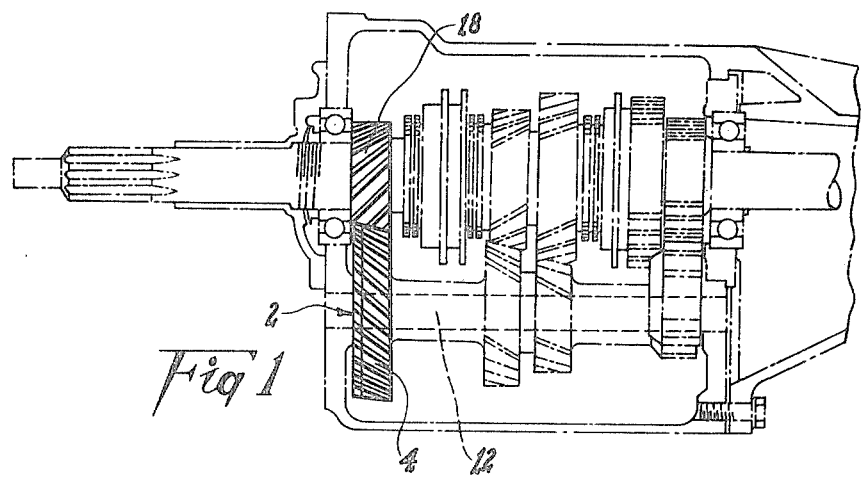
Fig 1
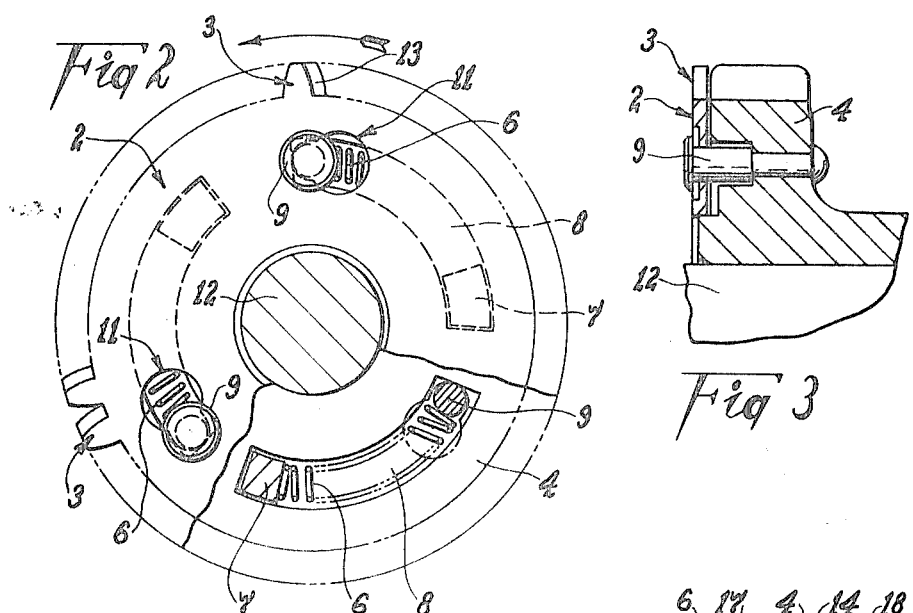
Fig 2
Fig 3
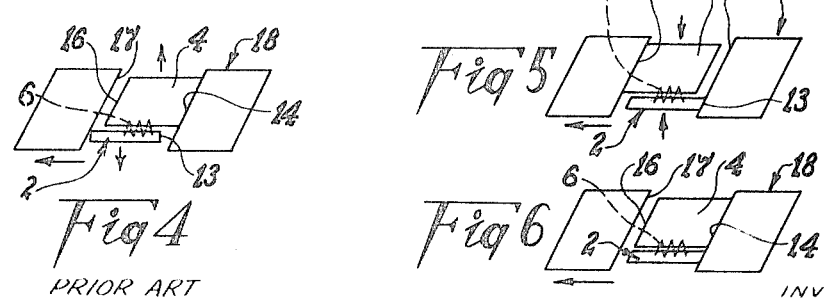
Fig 4 PRIOR ART
Fig 5
Fig 6
INVENTOR
Frank Fagarazzi
BY
a. M. Heiter
ATTORNEY

ANTILASH MECHANISM FOR THE CHANGE SPEED GEARING OF MOTOR VEHICLES AND OTHER PURPOSES

This invention relates to anti-lash mechanism for use in connection with the change speed gearing of motor vehicles and other purposes in which the gearing assembly includes a counter shaft fitted with a gear in constant mesh with a gear on the drive shaft.

More particularly, the invention is applicable to that type of anti-lash mechanism which involves the use of a spring influenced anti-lash gear connected to a constant mesh gear usually mounted on said counter shaft and which former gear is capable of limited angular movement relative to the constant mesh gear for the purpose of attempting to maintain constant engagement between driving and driven gears in respect of the speed of rotation of the latter gear. This type of mechanism is hereinafter referred to as being of the kind indicated.

Furthermore, such known anti-lash mechanisms have attempted to prevent oscillation of the driven gear relative to the driving gear by urging the driven gear into constant driven engagement with the driving gear. However, the conventional disposition of helical angle in change speed gearing is such that the aforesaid arrangement promotes axial separation of the anti-lash gear plate from its associated driven gear, and undesirable distortion of the anti-lash gear plate and other possible damage to the gearing may follow.

Hitherto, such a spring influenced anti-lash gear has been formed as a stamping from relatively heavy gauge sheet metal plate. As a result, the opposite faces of the teeth so formed are parallel to the axis of the gear plate. As it is conventional for the driving and driven gears of the assembly to be of helical formation, one corner only of each of the angular or square type of tooth on the gear plate makes contact with the helical surface of the associated driving gear, with the result that rapid wear of the gear plate teeth occurs, as well as undesirable scoring of the associated helical gear teeth. In addition, such a sheet metal anti-lash gear plate is inherently noisy in operation.

Other known change speed gearing does not include such an anti-lash gear plate. When the driven gear and its associated parts of such gearing are not subject to loading other than that induced by inertia and friction inherent in such gear mechanism, the teeth of the driving and driven gears do not maintain the same contact as when the gearing is transmitting power. On the contrary, the driven gear tends to oscillate between its normal driven position and a position in which the front surfaces of the driven gear teeth successively contact the rear surfaces of the driving gear teeth.

It is to be understood that the terms "front" and "rear" or "leading" and "trailing" are used throughout this specification in relation to the sense of the direction of rotation of the respective driving and driven gears. The aforesaid relative movement between such interengaged gears may be continuous during rotation and is frequently productive of undesirable noise which may be amplified by the gear casing.

When power is being transmitted through the counter gear cluster on the counter shaft and driven shaft, the aforesaid driven gear will remain in the loaded condition in which the front surfaces of the teeth on the driving gear are in contact with the rear surfaces of the teeth on the related driven gear during the period of interengagement. However, when power is being transmitted directly to the driven or main shaft, the counter gear cluster remains unloaded although still being driven.

The present invention is concerned with the latter condition of the gearing mechanism and the primary object of the invention is to provide improved anti-lash gear mechanism of the kind indicated whereby undesirable axial separation between the anti-lash and driven gears is opposed and the aforesaid other objectionable features of known types of anti-lash gearing mechanism are minimized.

The improved anti-lash gear mechanism comprises a driven gear adapted to remain in constant mesh with a helical driving gear, a helical anti-lash gear having the same helical tooth formation as the other helical gears axially coaligned with said driven gear and loosely mounted on one side thereof so that relative angular movement may occur between said anti-lash and driven gears and spring means associated with said anti-lash and driven gears and adapted to constantly urge said anti-lash and driven gears into relative angular movement in such a manner that when power is being transmitted both the driven gear and its anti-lash gear are in driven engagement with said driving gear, but when power is not being transmitted, said anti-lash gear remains in driven engagement with said driving gear and said spring means functions to effect such relative angular movement of said driven gear that it is moved into trailing engagement with said driving gear and axial separation between said anti-lash and driven gears is opposed.

Referring to the drawings:

FIG. 1 is a semi-diagrammatic longitudinal section of a motor vehicle gear box showing an anti-lash gear fitted to a driven gear on a lay shaft in accordance with the invention, FIG. 2 is a front view on an enlarged scale of the anti-lash gear in accordance with a preferred embodiment, FIG. 3 is a fragmentary cross section on an enlarged scale showing the means employed for interconnecting the anti-lash gear and its associated driven gear, FIG. 4 is a diagrammatic plan view showing the interengaged teeth of anti-lash gear mechanism in accordance with prior trade practice and indicating how stresses encountered when the gearing is unloaded tend to cause undesirable separation between an anti-lash gear plate and its associated driven gear, FIG. 5 is a similar view of anti-lash gearing in accordance with the present invention and showing how the stress encountered whilst the gearing is rotating in an unloaded condition tends to urge an anti-lash gear and its associated driven gear axially towards each other; and FIG. 6 is a view similar to FIG. 5, but showing the operative position of the anti-lash and driven gears when being rotated under loaded driving conditions.

In accordance with the present invention the aforesaid spring influenced anti-lash gear 2 is not formed as a sheet metal stamping, but is composed of a relatively thin plate of nylon or any other suitable plastic material from which the gear plate is capable of being readily molded.

For example, acetal copolymer with or without a glass filling has proved to be particularly suitable.

The plastic gear plate is moulded in such a manner that its peripheral teeth 3 substantially correspond in pitch, form and helix angle to those of its associated driven gear 4. As usual, the anti-lash gear is mounted in any suitable manner upon the outside of the driven gear in axial alignment therewith. This mounting is adapted to provide for rotation of the anti-lash gear 2 with the driven gear 4 and at the same time provide for limited relative rotation between these associated gears.

The anti-lash gear plate is spring influenced and for this purpose a plurality of circumferentially spaced coiled or other springs 6 may be mounted between abutments on the anti-lash gear plate and the driven gear respectively. For example, the anti-lash gear plate 2 may be provided with a series of circumferentially spaced lateral projections 7 adapted to be slidably accommodated within pockets 8 in the body portion of the driven gear 4.

These lateral projections may be formed integrally with the plastic gear plate, or if desired, they may be formed separately and connected thereto by cementing, or screws or in any other suitable manner.

The mounting on the driven gear for the anti-lash gear plate is in the form of a series of circumferentially spaced loose connections which may consist of screws or studs 9 carried by the driven gear 4 and which may be accommodated in substantially keyhole shaped apertures 11 in the anti-lash gear plate 2 so as to permit the desired limited relative rotation between these associated gears.

In use, whilst the counter shaft 12 and its gear cluster are rotating in an unloaded condition as aforesaid, the rear or trailing surfaces 13 of the teeth on the anti-lash gear plate 2 engage the front or leading surfaces of the driving gear teeth, whilst the front or leading surfaces 16 of the driven gear teeth engage the rear or trailing surfaces 17 of the driving gear teeth. The aforesaid springs 6 function to maintain the driving and driven gears in this desirable relationship during rotation, whilst the counter gear cluster is not transmitting power.

However, when the counter gear cluster is transmitting power, the springs permit relative rotation to occur between the anti-lash gear plate 2 and the driven gear 4 so as to permit the latter to assume its correct driven position with respect to the driving gear 18.

The shape of the teeth on the anti-lash gear plate conforms as closely as possible to the shape of the teeth on the driving gear with the result that they interengage in such a manner as to oppose axial separation of the anti-lash gear plate from the driven gear.

By forming the anti-lash gear plate from glass filled acetal copolymer or any other suitable plastic material which is capable of being readily molded, teeth of the desired shape may be economically formed on the plate thus avoiding costly machining operations which would otherwise be required, as well as avoiding the equally undesirable alternative of a gear plate having unsuitably shaped teeth such as results from metal stamping.

Finally, in accordance with the improved gear assembly the engagement between the teeth on the driving gear and the teeth on the anti-lash and driven gears is influenced by the aforesaid spring means in such a manner as to effectively oppose undesirable axial separation of the anti-lash gear from its associated driven gear, whilst in addition undesirable noise and excessive wear of the teeth on the anti-lash and driving gears is reduced to a minimum.

Although it is preferred to employ helically coiled springs 6 as aforesaid, it is to be understood that the invention is not limited thereto, but that various other types of compression or even tension springs may be employed if so desired.

Various other alterations, modifications and/or additions may be introduced into the foregoing construction and arrangement of parts without departing from the ambit of the invention as defined by the appended claims.

Having now described my invention, what I claim as new and desire to secure by Letters Patent is:

1. Anti-lach gear mechanism for the change speed gearing of motor vehicles and other purposes comprising a helical driven gear adapted to remain in constant mesh with a helical driving gear, a helical anti-lash gear axially coaligned with said driven gear and loosely mounted on one side thereof so that relative angular movement may occur between said anti-lash and driven gears, said driven, driving and anti-lash gear have teeth having leading and trailing faces and having the same helical formation, opposed abutments on said anti-lash and driven gears, spring means located between said abutments and having regard to the direction of rotation of said driven gear, the abutments on the driven gear are located in advance of the abutments on said anti-lash gear for operation when power is being transmitted with said spring means under maximum compression and both the driven gear and its anti-lash gear in driven engagement with said driving gear, but when power is not being transmitted, with said anti-lash gear remaining in driven engagement with said driving gear and said spring means operating to effect such relative angular movement of said driven gear that it is moved into trailing engagement with said driving gear and axial separation between said anti-lash and driven gears is opposed.

2. Anti-lash gear mechanism according to claim 1, wherein said anti-lash gear is composed of molded plastics material.

3. Anti-lash gear mechanism according to claim 2, wherein said anti-lash gear is composed of acetal copolymer.

4. Anti-lash gear mechanism according to claim 1, wherein said spring means consists of a series of circumferentially spaced helically coiled springs located within circumferentially spaced pockets in the driven gear, the abutments on said anti-lash gear consisting of laterally projecting shoulders formed integral with a body portion of said anti-lash gear, the abutments on said driven gear consisting of fasteners carried by said driven gear and extending laterally thereof through apertures in said anti-lash gear to serve as the loose connection between these components.

5. Anti-lash gear mechanism according to claim 4, wherein said apertures in the anti-lash gear are of substantially keyhole shape and said fasteners on the driven gear are each provided with a head portion capable of passing freely through the enlarged part of each keyhole slot, but adapted to overhang the opposed edges of said body portion defining the relatively narrower portion of each keyhole slot, so that the anti-lash gear may be fitted to and removed from said fasteners without disconnecting them from the driven gear.

6. Anti-lash gear mechanism according to claim 1, wherein said helical anti-lash gear is mounted on the side of the driven gear at which the teeth are advanced relative to the other side for providing a bias opposing axial separation of said driven and anti-lash gears when power is being transmitted and when power is not being transmitted.

* * * * *

PO-1050
(5/69)

UNITED STATES PATENT OFFICE
CERTIFICATE OF CORRECTION

Patent No. 3,648,534          Dated March 14, 1972

Inventor(s) Frank Fagarazzi

It is certified that error appears in the above-identified patent and that said Letters Patent are hereby corrected as shown below:

In the specification, column 2, line 1, after "a" insert -- helical --.

Signed and sealed this 29th day of August 1972.

(SEAL)
Attest:

EDWARD M. FLETCHER, JR.          ROBERT GOTTSCHALK
Attesting Officer          Commissioner of Patents